United States Patent
Hong et al.

(10) Patent No.: US 8,116,041 B2
(45) Date of Patent: Feb. 14, 2012

(54) FLEXIBLE PRINTED CIRCUIT HOLDING MECHANISM OF HARD DISK DRIVE INCLUDING FPC HOLDER AND FPC CLIP CLIPPED TO THE HOLDER, AND ACTUATOR ASSEMBLY INCLUDING THE SAME

(75) Inventors: Min-pyo Hong, Suwon-si (KR);
Byoung-gyou Choi, Suwon-si (KR);
No-yeol Park, Seongnam-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 1042 days.

(21) Appl. No.: 12/021,340

(22) Filed: Jan. 29, 2008

(65) Prior Publication Data

US 2008/0180851 A1    Jul. 31, 2008

(30) Foreign Application Priority Data

Jan. 29, 2007   (KR) .................. 10-2007-0008974

(51) Int. Cl.
*G11B 5/55*    (2006.01)
(52) U.S. Cl. .................................... 360/264.2
(58) Field of Classification Search ........... 360/264.2, 360/266.3
See application file for complete search history.

(56) References Cited

U.S. PATENT DOCUMENTS

| 5,805,377 | A | 9/1998 | Lerdal et al. |
| 5,818,667 | A * | 10/1998 | Larson ................. 360/264.2 |
| 5,953,183 | A | 9/1999 | Butler et al. |
| 6,480,362 | B1 | 11/2002 | Yoshida et al. |
| 7,054,110 | B2 * | 5/2006 | Nakamura et al. ......... 360/264.2 |
| 2005/0237672 | A1 | 10/2005 | Kamigama et al. |
| 2008/0151429 | A1 | 6/2008 | Tanizawa et al. |

FOREIGN PATENT DOCUMENTS

| JP | 09-251733 | 9/1997 |
| JP | 10-069736 | 3/1998 |
| JP | 2005-243178 | 9/2005 |
| KR | 1020010084543 A | 9/2001 |

OTHER PUBLICATIONS

Anonymous: "Snap On Tape Cable Clip. Oct. 1977." IBM Technical Disclosure Bulletin, vol. 20, No. 5, Oct. 1, 1977, pp. 1926-1927, XP-002496999.
Chinese Office Action corresponding to Chinese Patent Application No. 200810131439.2 dated Jan. 19, 2011 with English Translation.

* cited by examiner

*Primary Examiner* — A. J. Heinz
(74) *Attorney, Agent, or Firm* — Volentine & Whitt, PLLC

(57) ABSTRACT

An FPC holding mechanism of an actuator assembly of a hard disk drive (HDD) includes an FPC holder protruding from an arm-mold of the actuator assembly, and an FPC clip mounted to the FPC holder so as to be rotatable. The FPC holder defines a guide groove into which the FPC is inserted and a first side support plate facing one side surface of the FPC. The FPC clip includes a second side support plate juxtaposed with the first side support plate and facing the other side surface of the FPC, and at least two clip arms extending in a horizontal direction over upper and lower edges of the FPC, respectively. At least one of the clip arms has a hook hooked onto the first side support plate. The FPC holding mechanism thus prevents a portion of the FPC from moving in vertical and horizontal directions.

8 Claims, 7 Drawing Sheets

US 8,116,041 B2

FLEXIBLE PRINTED CIRCUIT HOLDING MECHANISM OF HARD DISK DRIVE INCLUDING FPC HOLDER AND FPC CLIP CLIPPED TO THE HOLDER, AND ACTUATOR ASSEMBLY INCLUDING THE SAME

BACKGROUND OF THE INVENTION

1. Field of the Invention

The present invention relates to a hard disk drive (HDD). More particularly, the present invention relates to an actuator assembly of a hard disk drive and to a mechanism that supports a flexible printed circuit (FPC) and couples the FPC to an arm of the actuator assembly.

2. Description of the Related Art

A hard disk drive (HDD) is a device used to store information in computers and the like. More specifically, an HDD includes a disk on which information is magnetically recorded, and a magnetic head that reproduces (reads) data from or records (writes) data onto the disk. The HDD also includes an actuator assembly for moving the magnetic head to desired positions over the disk during read/write operations.

FIG. 1 is a perspective view of a conventional actuator assembly 10 of an HDD. FIG. 2 is an enlarged plan view of a conventional FPC holder 22 of the actuator assembly 10 illustrated in FIG. 1.

Referring to FIGS. 1 and 2, the actuator assembly 10 of the HDD includes a pivot bearing 11, an arm-mold 12 that is supported by the pivot bearing 11, an actuator arm 13 attached to the arm-mold 12, a suspension assembly 15 that is attached to the actuator arm 13 and supports a magnetic head 14 so as to elastically bias the magnetic head 14 towards a surface of a disk, and a voice coil motor (VCM) 16 for rotating the arm-mold 12 and the actuator arm 13 about an axis of the pivot bearing 13. The VCM 16 includes a voice coil 17 attached to the arm-mold 12, and a magnet(s) 18 disposed above and/or below the voice coil 17 as facing the voice coil 17.

A flexible printed circuit (FPC) 20 is attached to the actuator assembly 10 and is electronically connected to the magnetic head 14. The flexible printed circuit (FPC) 20 applies signals to and receives signals from the magnetic head 14. In this way, the magnetic head 14 can search the disk for specific information, for example. In this respect, an FPC holder 22 for supporting the FPC 20 protrudes from the arm-mold 12 of the actuator assembly 10. The FPC 20 is fixed to an FPC stiffener 24 attached to a side surface of the arm-mold 12, and is coupled to a pre-amplifier 26 at the FPC stiffener 24. In addition, an end of the FPC 20 is electrically bonded by a solder ball 29 to a second FPC 28 extending from the magnetic head 14.

As illustrated in FIG. 2, the FPC holder 22 protrudes from the arm-mold 12 in a horizontal direction, and extends a predetermined length in a direction approximately parallel to the actuator arm 13. A guide groove 23 into which the FPC 20 is inserted is formed in the FPC holder 22, and has a width that is greater than the thickness of the FPC 20.

The FPC 20 is stably supported by the FPC holder 22 within the guide groove 23 during read/write operations in which the arm 13 is being rotated in a horizontal plane about the axis of the pivot bearing 13. However, the actuator assembly 10 can move in vertical and horizontal directions when the actuator assembly 10 is being fixed to a base of the HDD. The FPC 20 can escape from the guide groove 23 of the FPC holder 22 when the FPC 20 is moved in a vertical direction. Likewise, the FPC 20 can escape from the guide groove 23 when the actuator assembly 10 is being assembled. Even in the case in which the FPC 20 remains within the guide groove 23 while the actuator assembly 10 is in use, the FPC 20 can move in a horizontal direction. This movement of the FPC 20, which applies electronic signals to and receives signals from the magnetic head 14, adversely affects the ability of the magnetic head 14 to search the disk.

In an effort to prevent the above-described problems from occurring, i.e., to prevent the FPC 20 from moving relative to or escaping from the guide groove 23, the FPC 20 has been fixed to the FPC holder 22 by epoxy adhesives applied to the surfaces of the FPC holder 22 that delimit the inner surface of the guide groove 23. In this case, therefore, the manufacturing of the actuator assembly 10 includes steps of coating the FPC holder with adhesive and then curing the adhesive in a heated chamber. Accordingly, additional manufacturing costs are incurred. In addition, if a performance test of the actuator assembly 10 deems that the actuator assembly 10 has problems, the actuator assembly 10 needs to be re-assembled. In this case, the FPC 20 needs to be detached from the actuator assembly 10. However, an FPC 20 adhered to the FPC holder 22 cannot be easily detached from the actuator assembly 10. In addition, gas emanating from the adhesive can contaminate the inside of an HDD, in which case the reliability of the HDD can decrease.

Also, as described above, the FPC 20 is soldered to the second FPC 28. The normal position of the FPC 20, though, hinders this soldering operation. Thus, the FPC 20 must be bent laterally, as indicated by the chain lines in FIG. 2, when the soldering is performed. In this case, the bending of the FPC 20 may permanently damage the FPC.

SUMMARY OF THE INVENTION

An object of the present invention is to provide a flexible printed circuit (FPC) holding mechanism of an actuator assembly of a hard disk drive (HDD), which can support an FPC so that the FPC will not escape from the actuator assembly during use.

Another object of the present invention is to provide a flexible printed circuit (FPC) holding mechanism of an actuator assembly of a hard disk drive (HDD), from which an FPC can be easily detached.

Yet another object of the present invention is to provide a flexible printed circuit (FPC) holding mechanism of an actuator assembly of a hard disk drive (HDD), which supports an FPC and allows a soldering operation, in which the FPC is bonded to another FPC extending from the magnetic head of the assembly, to be easily carried out.

According to one aspect of the present invention, an FPC holding mechanism of a hard disk drive includes a first side support plate confronting one major side surface of the FPC, a second side support plate juxtaposed with the first side support plate and confronting the other major side surface of the FPC, and arms each integral with a respective one of the side support plates. The arms extend across the portion of the FPC received between the side support plates and are disposed adjacent upper and lower edges of the FPC, respectively. The distal end of at least one of the arms, integral with one of the side support plates, has a hook that is hooked onto the other of the side support plates. The first side support plate is part of an FPC holder which protrudes at a side of the actuator assembly. The FPC holder defines a guide groove through which the FPC extends. Lateral movement of the portion of the FPC interposed between the side support plates is thus inhibited by the side support plates. On the other hand, movement of the FPC in the direction of its width is inhibited by the arms.

According to another aspect of the present invention, the second support plate is part of an FPC clip mounted to the FPC holder so as to be rotatable relative to the side support plate of the FPC holder. The FPC clip may comprise flexible plastic and preferably comprises polycarbonate. The FPC clip includes at least two clip arms extending horizontally from the second side support across the portion of the FPC that is interposed between the side support plates. That is, the clip arms extend in a direction perpendicular to the direction of the width of the portion of the FPC interposed between the side support plates. Thus, horizontal movement of the FPC (movement perpendicular to the direction of its width) is inhibited by the side support plates, whereas vertical movement of the FPC (movement in the direction of its width) is inhibited by the clip arms.

Either the FPC holder or the FPC clip may have a boss, and the other of the FPC holder and the FPC clip has a hole into which the boss extends. Thus, the FPC clip may be rotated around a central axis of the boss. The boss may protrude downwardly from a bottom surface of the FPC holder. In this case, the FPC clip has a support arm, and the support arm has the hole into which the boss extends so as to be freely rotatable.

The first side support plate may face an internal side surface of the FPC, in which case the second support plate faces an external side surface of the FPC. That is, the side support plate of the FPC holder may be disposed inwardly of the side support plate of the FPC clip. Also, the first side support plate may extend parallel to the so-called swing arm of the actuator assembly, i.e., the arm that supports the magnetic head of the hard disk drive.

The clip arms of the FPC clip may include a first clip arm extending (horizontally) direction from the top of the second side support plate, a second clip arm extending (horizontally) from the bottom of the second side support plate, and a third clip arm extending (horizontally) from an upper end of the second side support plate as spaced laterally along the top of the first side support plate from the first clip arm. The first and second clip arms may each have a hook that is hooked onto the side support plate of the FPC clip.

According to another aspect of the present invention, there is provided an actuator assembly of a hard disk drive, including a pivot bearing defining an axis of rotation, an arm-mold attached to the pivot bearing so as to be rotatable about the axis of rotation, an actuator arm attached to the arm-mold, a magnetic head, a suspension assembly to which the magnetic head is mounted, a voice coil supported by the arm-mold, and a flexible printed circuit (FPC) holding mechanism that includes a first side support plate, a second side support plate juxtaposed with the first side support plate, and arms each integral with a respective one of the side support plates.

The first side support plate is part of an FPC holder forming a protrusion at a side of the arm-mold, and the FPC holder also defines a guide groove dedicated to receive an FPC. Thus, a portion of the FPC can be interposed between the side support plate of the FPC holder and the second side support plate such that lateral movement of said portion of the FPC in a direction perpendicular to the direction of its width is inhibited by the side support plates. Each of the arms has a proximate end at which the arm is integral with and extends from a respective one of the side support plates. The arms span the side support plates at opposite sides (top and bottom) of the side support plates, respectively. Thus, the arms inhibit movement of the FPC in the vertical direction, i.e., in the direction of the width of the FPC.

Also, a distal end of at least one of the arms, which arm is integral with a respective one of the side support plates, comprises a hook that is hooked onto the other of the side support plates. The hook detachably connects the side support plate of the FPC holder to the second side support plate.

BRIEF DESCRIPTION OF THE DRAWINGS

The above and other objects, features and advantages of the present invention will become more apparent by referring to the following detailed description of the preferred embodiments thereof made with reference to the attached drawings in which.

DETAILED DESCRIPTION OF THE PREFERRED EMBODIMENTS

Figure 1:
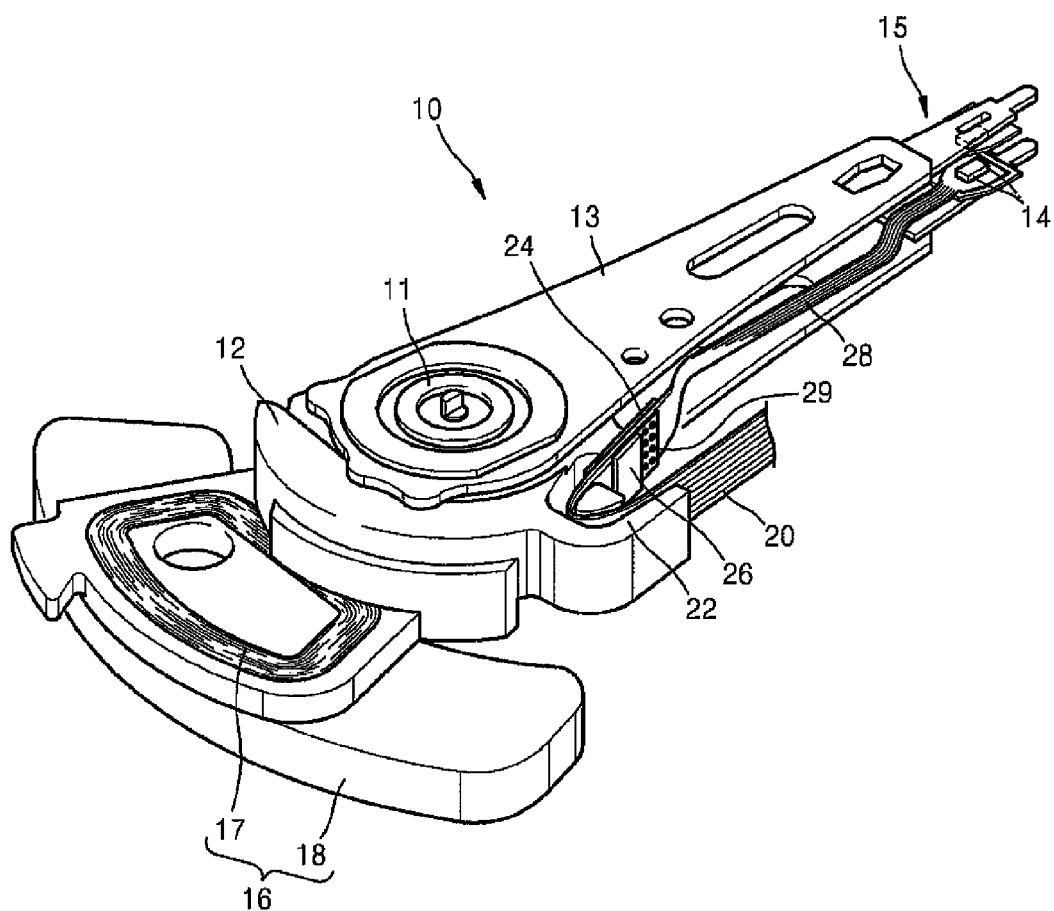
FIG. 1 is a perspective view of a conventional actuator assembly of a hard disk drive (HDD)
Figure 2:
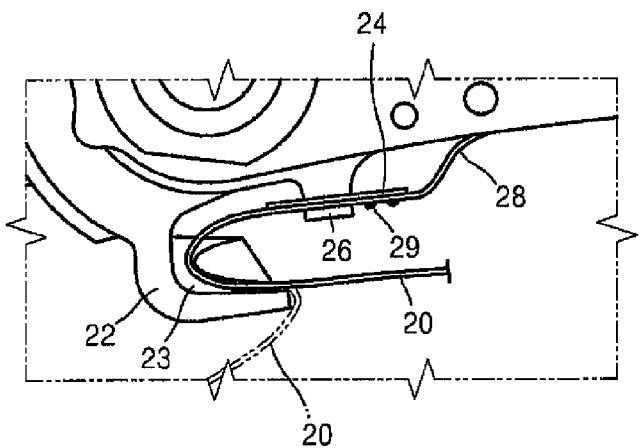
FIG. 2 is an enlarged plan view of a conventional flexible printed circuit (FPC) holder of the actuator assembly illustrated in FIG. 1.

The present invention will be described in detail hereinafter with reference to the attached drawings. The same reference numerals denote the same elements throughout the drawings.

Figure 3:
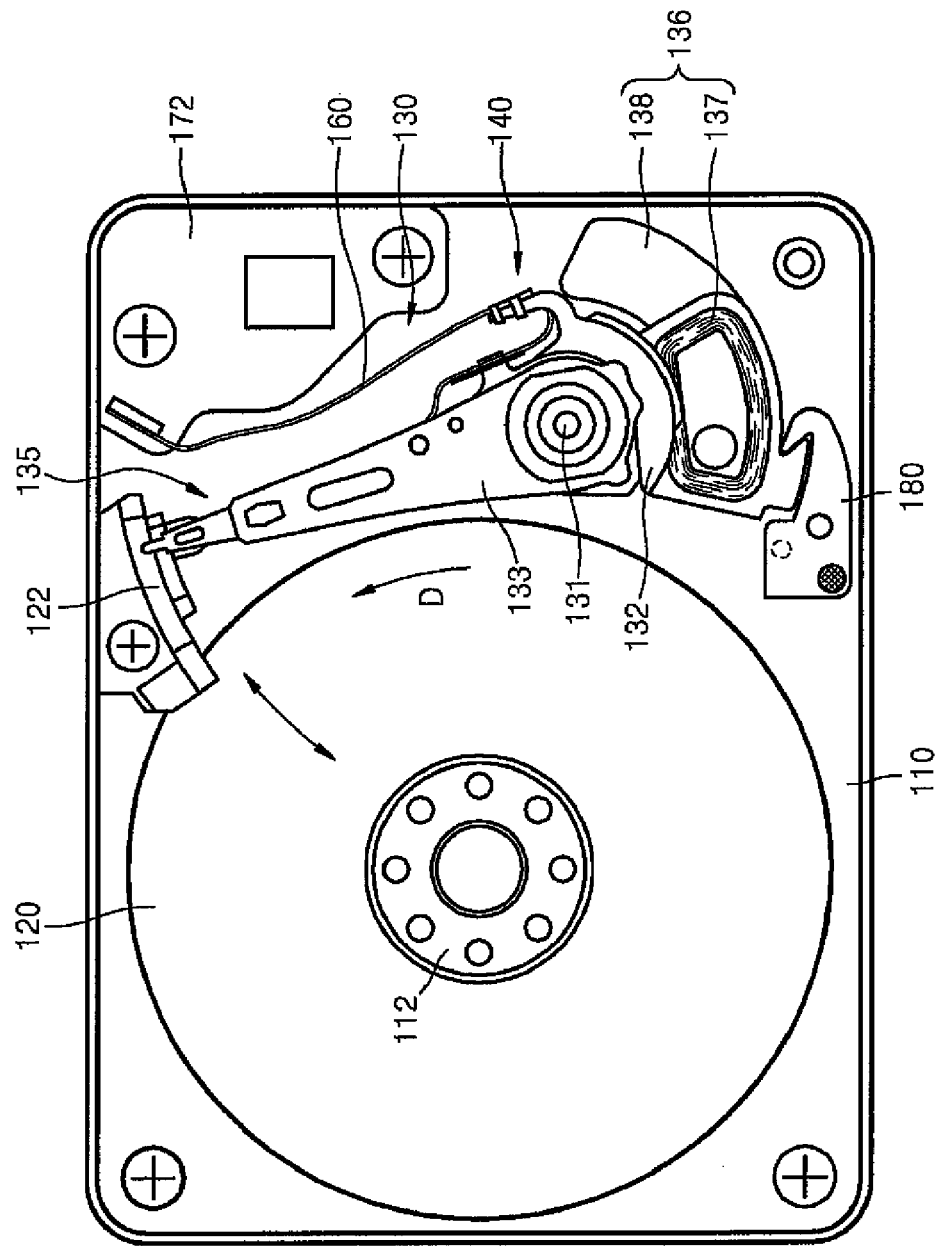
FIG. 3 is a plan view of a HDD including an actuator assembly, according to the present invention.
Figure 4:
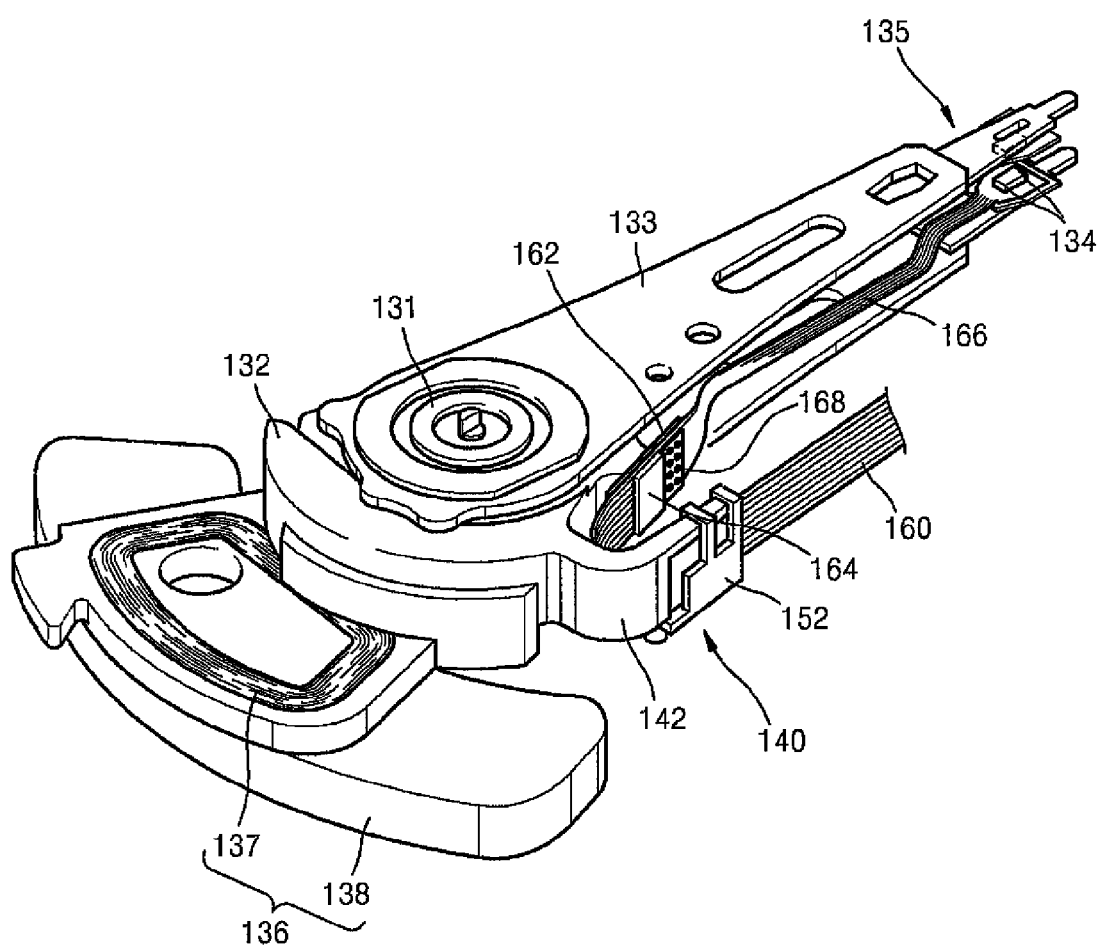
FIG. 4 is a perspective view of the actuator assembly of the HDD illustrated in FIG. 3, according to the present invention.

Referring first to FIGS. 3 and 4, an HDD according to the present invention includes a base 110, a spindle motor 112 mounted to the base, a disk 120 mounted to the spindle motor 112, a magnetic head 134 for recording data on and reproducing data from the disk 120, and an actuator assembly 130 that positions the magnetic head 134 over the disk 120 during a read/write operation in which data is being reproduced from/recorded on the disk 120. The actuator assembly 130 includes a bearing 131 mounted on a base 110 of the HDD, an arm-mold 132 that is attached to the bearing 131, an actuator arm 133 attached to the arm-mold 132, a suspension assembly 135 that is attached to the actuator arm 133 and supports the magnetic head 134 in such as way as to elastically bias the magnetic head 134 towards a surface of the disk 120, and a voice coil motor (VCM) 136 for rotating the arm-mold 132 and the actuator arm 133 about an axis of the bearing 131.

The VCM 136 includes a voice coil 137 attached to the arm-mold 132, and a magnet(s) 138 disposed above and/or below the voice coil 137 and facing the voice coil 137. The VCM 136 is controlled by a servo control system, which supplies current to the voice coil 137. The actuator arm 133 is rotated about the axis of the bearing 131, in a direction corresponding to Fleming's left hand rule, due to an interaction between the current flowing through the voice coil 137 and the magnetic field generated by the magnet(s) 138.

The operation of the VCM 136 will be described in connection with an HDD including a ramp loading type of parking system as shown in FIG. 3. In a ramp loading type of parking system, a ramp is disposed radially outwardly of the disk 120, and the magnetic head 134 is parked via a ramp 122 when the actuator arm 133 is located at a position at which the magnetic head 134 is disposed radially outwardly of the disk. In this embodiment, when the HDD is turned on, the disk 120 starts rotating in the direction indicated by the arrow "D", and current is supplied to the voice coil 137 of the VCM 136 in a direction that causes the actuator arm 133 to rotate counterclockwise about the axis of bearing 131. Therefore, the magnetic head 134 is moved from its parked position to a position over a recording surface of the disk 120. On the other hand, when the HDD is turned off, the disk 120 stops rotating, and current is supplied to the voice coil 137 of the VCM 136 in a direction that causes the actuator arm 133 to rotate clockwise about the axis of bearing 131. Thus, the magnetic head 134 is moved radially outwardly of the disk 120 and is parked.

The HDD also includes a latch lever 180 that locks the actuator assembly 130 so that the magnetic head 134 remains parked when the HDD is not performing a read/write operation, for example.

In addition, the HDD includes a printed circuit board (PCB) 172, and a flexible printed circuit (FPC) 160 that extends from and is electronically connected to the PCB 172. The FPC 160 transmits electronic signals between the PCB 172 and the magnetic head 134. In this respect, an FPC holding mechanism 140 supports the FPC 160 and forms the means by which the FPC 160 is attached to the actuator assembly 130. The FPC 160 is also fixed to an FPC stiffener 162 attached to a side surface of the arm-mold 132, and is electronically coupled to a pre-amplifier 164 at the FPC stiffener 162. An end of the FPC 160 is electrically bonded (by solder balls 168) to a second FPC 166 extending from the magnetic head 134.

Figure 5:
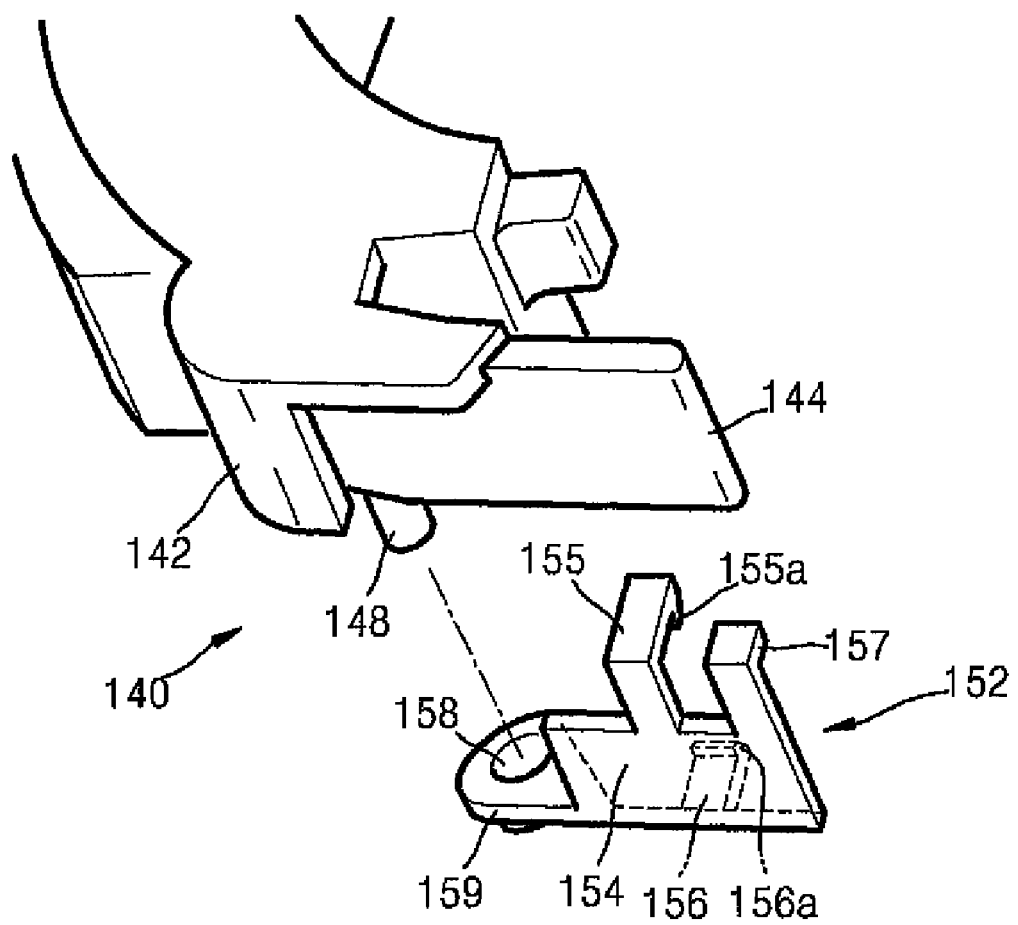
FIG. 5 is an exploded perspective view of an FPC holder of the actuator assembly illustrated in FIG. 4, according to an embodiment of the present invention.
Figure 6:
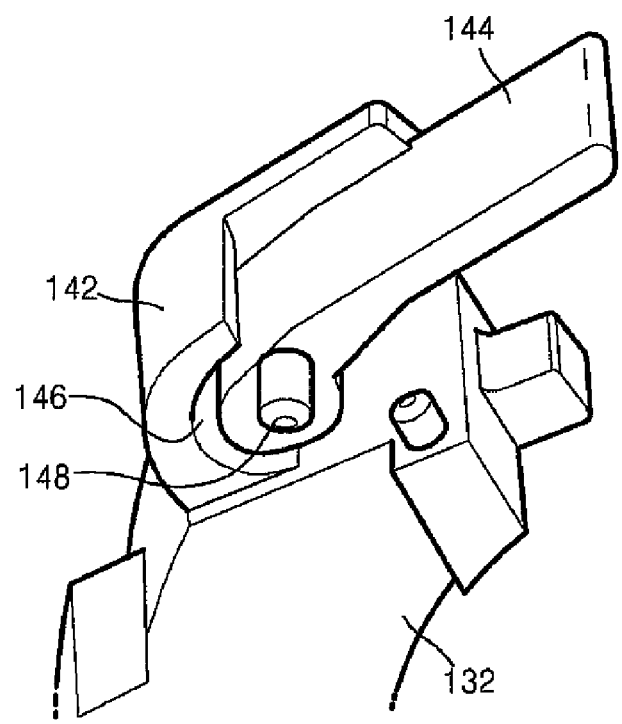
FIG. 6 is a perspective view, from below, of the FPC holder illustrated in FIG. 5, according to the present invention.
Figure 7:
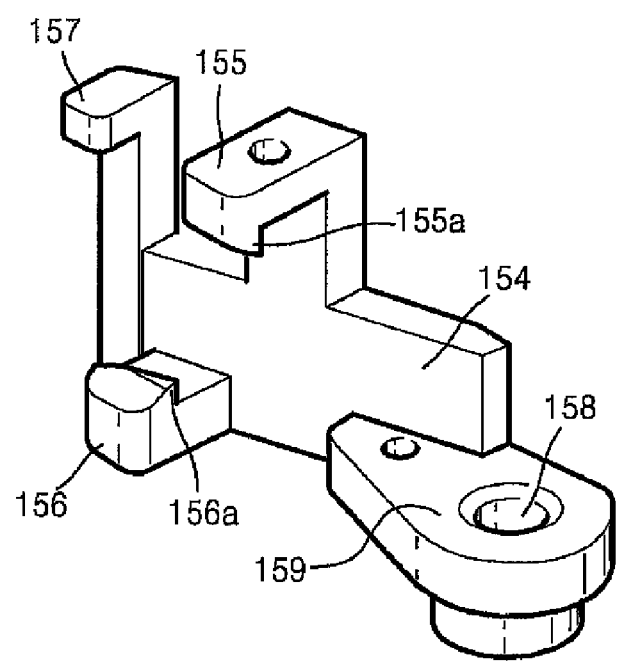
FIG. 7 is a perspective view of an FPC clip of the FPC holder illustrated in FIG. 5, according to the present invention.

The FPC holding mechanism 140 will now be described in more detail with reference to FIGS. 5, 6 and 7. The FPC holding mechanism 140 includes an FPC holder 142 protruding from the arm-mold 132 of the actuator assembly 130 in a horizontal direction, and an FPC clip 152 that is attached to the FPC holder 142. The FPC holder 142 defines a guide groove 146 through which the FPC 160 extends, and includes a first side support plate 144 confronting an internal side surface of that portion of the FPC 160 which extends through the guide groove 146. The width of the guide groove 146 is slightly greater than the thickness of the FPC 160 so that the FPC 160 can be easily inserted into the guide groove 146. The first side support plate 144 preferably extends in a direction approximately parallel to the actuator arm 133. In addition, the FPC holder 142 includes a boss 148. The boss 148 protrudes downwardly from a bottom surface of the FPC holder 142. Alternatively, the boss 148 may protrude upwardly from a top surface of the FPC holder 142.

The FPC clip 152 is rotatable relative to the FPC holder 142 and yet is detachable from the FPC holder 142. More specifically, the FPC clip 152 includes a support arm 159 having a hole 158 in which the boss 148 is received such that the FPC clip 152 can rotate around the boss 148. Alternatively, a hole may be defined in the FPC holder 142, and the FPC clip 152 may have a boss 148 that extends into the hole in the FPC holder. The FPC clip 152 also includes a second side support plate 154 supported by the support arm 159, and at least two clip arms 155 and 156 extending from the second side support plate 154. The FPC clip 152 having the above-described structure may be formed of a flexible material (e.g., plastic), preferably, polycarbonate.

The side support plate 154 of the FPC clip 152 faces the side support plate 144 of the FPC holder 142, and confronts the external side surface of the FPC 160. That is, the FPC 160 is sandwiched between the side support plate 144 of the FPC holder 142 and the side support plate 154 of the FPC clip 152. Thus, the FPC 160 is prevented from moving in a horizontal direction.

The at least two clip arms 155 and 156 of the FPC clip 152 include a first clip arm 155 extending horizontally from an upper end of the side support plate 154, and a second clip arm 156 extending horizontally from a lower end of the side support plate 154. That is, each of the first and second clip arms 155 and 156 extends perpendicular to the side support plate 154. Accordingly, the first clip arm 155 and the second clip arm 156 are disposed above and below the FPC 160 so as to prevent the FPC 160 from moving in a vertical direction. In addition, a distal end of the first clip arm 155 (i.e., an end of the first clip arm 155 remote from the support plate 154) has a first hook 155a. The first hook 155a can be hooked over an upper edge of the first side support plate 144 of the FPC holder 142 to prevent the FPC clip 152 from escaping from the FPC holder 142. In addition, a distal end of the second clip arm 156 has a second hook 156a. The second hook 156a can be hooked over a lower edge of the first side support plate 144 of the FPC holder 142 to ensure that the FPC clip 152 remains fixed relative to the FPC holder 142.

The FPC clip 152 may also include a third clip arm 157 that extends horizontally from an upper edge of the side support plate 154 as spaced from the first clip arm 155. The third clip arm 157 ensures, along with the first clip arm 155, that the FPC 160 will not move in a vertical direction within the guide groove 146.

Figure 8A:
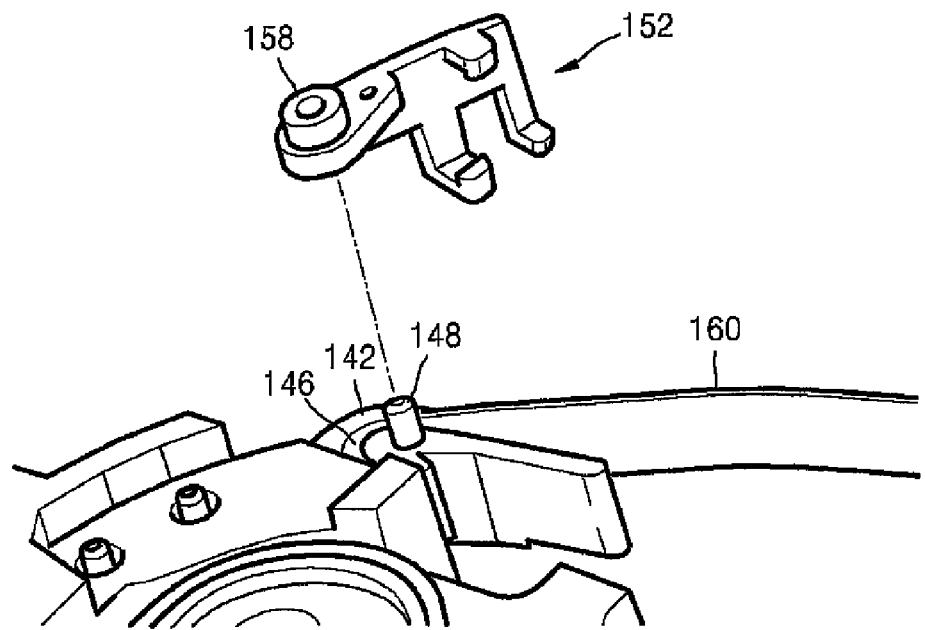
FIGS. 8A, 8B and 8C are perspective views, respectively, of the FPC holder from below and together illustrate a process of fixing an FPC to an actuator assembly according to the present invention.
Figure 8B:
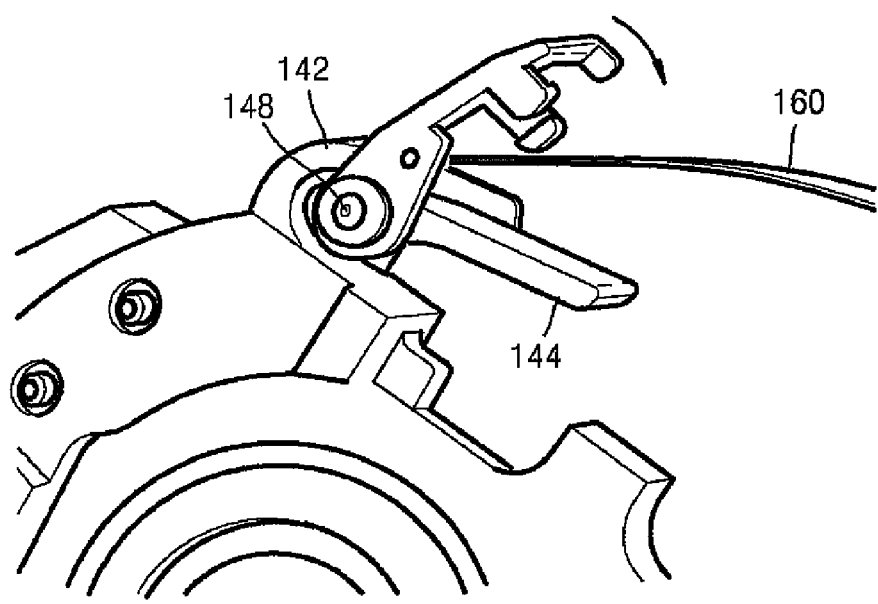
Figure 8C:
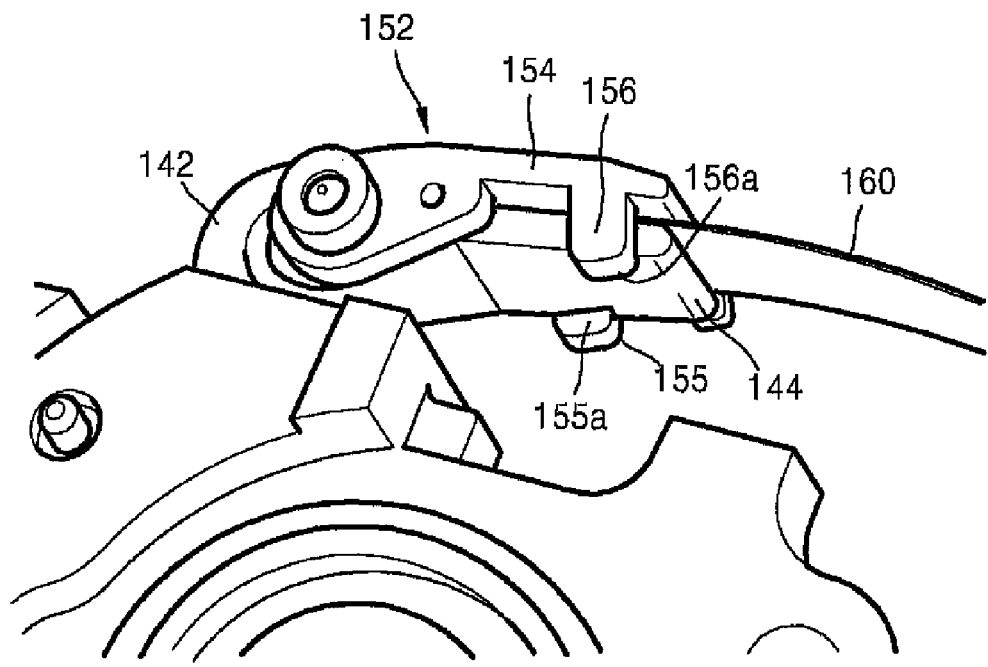

FIGS. 8A, 8B and 8C illustrate the way in which the FPC 160 is attached to the actuator assembly 130 using the FPC holding mechanism 140 according to the present invention.

Referring to FIG. 8A, the FPC 160 is inserted into the guide groove 146 of the FPC holder 142. Then, the boss 148 of the FPC holder 142 is inserted into the hole 158 in the FPC clip 152 so that the FPC clip 152. Next, as illustrated in FIG. 8B, the FPC clip 152 is rotated in a direction that brings the side support plate of the FPC clip 152 towards the side support plate of the FPC holder 142. Then, as illustrated in FIG. 8C, the first hook 155a and the second hook 156a of the FPC clip 152 are respectively hooked over the upper and lower edges of the side support plate 144 of the FPC holder 142. Thus, the FPC clip 152 is securely fixed to the FPC holder 142.

In this state, the FPC 160 is prevented from moving horizontally within the guide groove 146 due to the side support plate 144 of the FPC holder 142 and the side support plate 154 of the FPC clip 152. Also, the FPC 160 is prevented from moving vertically within the guide groove 146 due to the first clip arm 155, the second clip arm 156, and the third clip arm 157. Thus, the FPC 160 will not escape from the guide groove 146 of the FPC holder 142 when the actuator assembly 130 is fixed to a base 110 of the HDD. In addition, the magnetic head 134 will operate reliably, especially in a mode in which the magnetic head 134 is searching the disk 120, because the portion of the FPC 160 attached to the actuator assembly 130 will not rock. Furthermore, the actuator assembly 130 can be easily disassembled and re-assembled because the FPC 160 can be readily detached from and reattached to the actuator assembly 130 using the FPC clip 152. Thus, costs associated with the manufacturing of the actuator assembly 130 can be saved.

Figure 9:
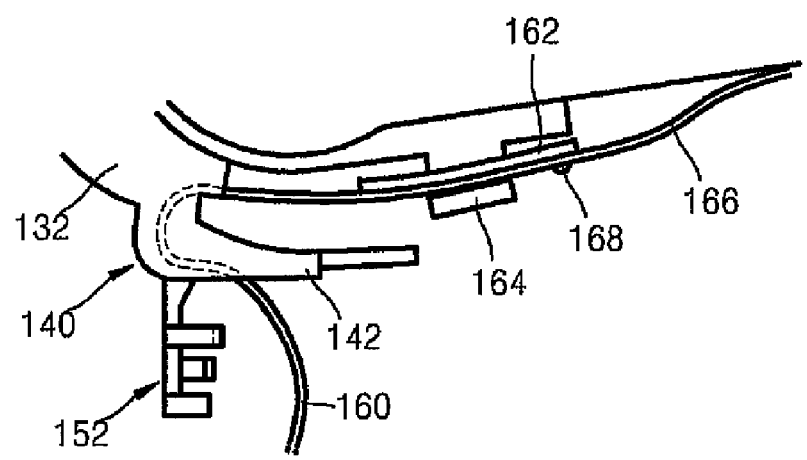
FIG. 9 is an enlarged plan view of the FPC holder according to the present invention in a position at which an FPC can be soldered to a second FPC.

A soldering operation performed to connect the FPC 160 to the second FPC 166, in an actuator assembly according to the present invention, will now be described with reference to FIG. 9.

The FPC 160 is bonded to the second FPC 166 using solder balls 168 so that the FPC 160 is electronically connected to the second FPC 166. Such soldering is performed when the FPC 160 is laterally bent so that the region at which the first and second FPCs 160, 166 are soldered together can be easily accessed. At this time, as illustrated in FIG. 9, the FPC clip 152 is opened to allow the FPC to be bent laterally, i.e., out of the way of the soldering equipment. Thus, the FPC 160 can be bent without being constrained by the FPC holding mechanism 140. Accordingly, the FPC 160 will not be damaged.

Finally, although the present invention has been described in connection with the preferred embodiments thereof, it is to be understood that the scope of the present invention is not so limited. On the contrary, various modifications of and changes to the preferred embodiments will be apparent to those of ordinary skill in the art. Thus, changes to and modifications of the preferred embodiments may fall within the true spirit and scope of the invention as defined by the appended claims.

What is claimed is:

1. In a hard disk drive (HDD) having a magnetic head, an actuator assembly that supports and positions the magnetic head, and a flexible printed circuit (FPC) electronically coupled to the magnetic head and having opposite major side surfaces, an FPC holding mechanism comprising:

an FPC holder constituted by a protrusion at a side of the actuator assembly, the FPC holder defining a guide groove through which the FPC extends, and the FPC holder including a first side support plate confronting one of the major side surfaces of the FPC;

a second side support plate attached to the FPC holder;

means for supporting the second side support plate so as to be rotatable, while remaining attached to the FPC holder, about an axis between a first position and a second position relative to the first side support plate, the second side support plate being juxtaposed with the first side support plate and confronting the other major side surface of the FPC, and a portion of the FPC being interposed between the side support plates when the second side support plate is in the first position thereof such that lateral movement of said portion of the FPC in a direction perpendicular to the direction of its width is inhibited by the side support plates, and the second side support plate extending laterally with respect to the first side support plate when the second side support plate is in the second position thereof such that the FPC can be bent laterally with respect to the first side support plate at a location adjacent the first side support plate; and at least two arms each having a proximate end at which the arm is integral with and extends from a respective one of the side support plates, and a distal end, the arms extending across said portion of the FPC in a direction perpendicular to the direction of the width of said portion of the FPC and disposed adjacent upper and lower edges of the FPC, respectively, when the second side support plate is in the first position thereof such that movement of the FPC in the direction of its width is inhibited by the arms, and the distal end of at least one of the arms, which extends from a respective one of the side support plates, comprising a hook that is hooked onto the other of the side support plates and detachably connects the side support plate of the FPC holder to the second side support plate when the second side support plate is in the first position thereof.

2. The FPC holding mechanism in an HDD as claimed in claim 1, wherein the first side support plate is disposed inwardly of the second side support plate with respect to said side of the actuator assembly.

3. The FPC holding mechanism in an HDD as claimed in claim 1, wherein the first side support plate extends parallel to the actuator arm of the actuator assembly.

4. An actuator assembly of a hard disk drive (HDD), comprising:

a pivot bearing defining an axis of rotation;

an arm-mold attached to the pivot bearing so as to be rotatable about the axis of rotation;

an actuator arm attached to the arm-mold;

a magnetic head;

a suspension assembly to which the magnetic head is mounted, the suspension assembly attached to the actuator arm and biasing the magnetic head;

a voice coil of a voice coil motor (VCM), the voice coil being supported by the arm-mold;

a flexible printed circuit (FPC) holder protruding at a side of the arm-mold, the FPC holder defining a guide groove dedicated to receive a flexible printed circuit (FPC), and the FPC holder including a side first support plate;

a second side support plate disposed in a first position at which the second side support plate is juxtaposed with the side support plate of the FPC holder with such a spacing therebetween that a portion of the FPC can be interposed between the first and second side support plates and such that lateral movement of said portion of the FPC in a direction perpendicular to the direction of its width is inhibited by the first and second side support plates; and at least two arms each having a proximate end at which the arm is integral with and extends from a respective one of the side support plates, and a distal end, the distal end of at least one of the arms comprising a hook, and wherein the arms span the first and second side support plates at opposite sides of the side support plates, respectively, when the second side support plate is in the first position thereof such that movement of the portion of an FPC received between the first and second side support plates is inhibited by the arms in the direction of the width of said portion of the FPC, and the hook is hooked onto the other of the side support plates when the second side support plate is in the first position thereof such that the hook detachably connects the first side support plate to the second side support plate, and the second side support plate is mounted to the FPC holder so as to be rotatable from the first position away from the side support plate of the FPC holder to a second position at which the hook is detached from the other of the side support plates.

5. The actuator assembly as claimed in claim in claim 4, wherein a boss is integral with one of the FPC holder and the second side support plate, and the other of the FPC holder and the second side support plate has a hole into which the boss extends, the second side support plate being rotatable about a longitudinal axis of the boss between the first position and the second position.

6. An actuator assembly of a hard disk drive (HDD), comprising:

a pivot bearing defining an axis of rotation;

an arm-mold attached to the pivot bearing so as to be rotatable about the axis of rotation;

an actuator arm attached to the arm-mold;

a magnetic head;

a suspension assembly to which the magnetic head is mounted, the suspension assembly attached to the actuator arm and biasing the magnetic head;

a voice coil of a voice coil motor (VCM), the voice coil being supported by the arm-mold;

a flexible printed circuit (FPC) holder protruding at a side of the arm-mold, the FPC holder defining a guide groove dedicated to receive a flexible printed circuit (FPC), and the FPC holder including a side first support plate;

a second side support plate disposed in a first position at which the second side support plate is juxtaposed with the side support plate of the FPC holder with such a spacing therebetween that a portion of the FPC can be interposed between the first and second side support plates and such that lateral movement of said portion of the FPC in a direction perpendicular to the direction of its width is inhibited by the first and second side support plates; and first, second and third arms each having a proximate end at which the arm is integral with and extends from a respective one of the side support plates, and a distal end, the first and second arms spanning the first and second side support plates at opposite sides of the side support plates, respectively, and the third clip arm spanning the first and second side support plates at a side of the first and second support plates constituting the top of the side support plates when the actuator assembly is oriented right side up such that movement of the portion of an FPC received between the first and second side support plates is inhibited by the first, second and third arms in the direction of the width of said portion of the FPC, and the distal end of at least one of the arms extending from one of the first and second side support plates comprising a hook that is hooked onto and detachable from the other of the first and second side support plates.

7. The actuator assembly as claimed in claim 6, wherein the second side support plate is mounted to the FPC holder so as to be rotatable from the first position away from the side support plate of the FPC holder to a second position at which the hook is detached from the other of the side support plates.

8. The actuator assembly as claimed in claim 7, wherein a boss is integral with one of the FPC holder and the second side support plate, and the other of the FPC holder and the second side support plate has a hole into which the boss extends, the second side support plate being rotatable about a longitudinal axis of the boss between the first position and the second position.

* * * * *